(12) United States Patent
Wilson et al.

(10) Patent No.: US 7,395,077 B2
(45) Date of Patent: Jul. 1, 2008

(54) TELECOMMUNICATIONS SERVICES APPARATUS

(75) Inventors: Jeffrey Wilson, Fareham (GB); Robert Stafford Harding, Southampton (GB)

(73) Assignee: Telsis Holdings Limited, Fareham (GB)

( * ) Notice: Subject to any disclaimer, the term of this patent is extended or adjusted under 35 U.S.C. 154(b) by 168 days.

(21) Appl. No.: 10/679,529

(22) Filed: Oct. 6, 2003

(65) Prior Publication Data
US 2005/0101337 A1 May 12, 2005

(30) Foreign Application Priority Data
Oct. 11, 2002 (GB) ................................ 0223576.0

(51) Int. Cl.
*H04Q 7/20* (2006.01)
*H04M 11/00* (2006.01)
(52) U.S. Cl. .................................... 455/466; 379/88.13
(58) Field of Classification Search .............. 379/88.13; 455/466; 378/88.13
See application file for complete search history.

(56) References Cited

U.S. PATENT DOCUMENTS

| | | | | |
|---|---|---|---|---|
| 6,101,393 | A * | 8/2000 | Alperovich et al. | 455/466 |
| 6,108,559 | A * | 8/2000 | Astrom et al. | 455/466 |
| 6,182,118 | B1 * | 1/2001 | Finney et al. | 709/206 |
| 6,311,210 | B1 * | 10/2001 | Foladare et al. | 709/206 |
| 6,560,318 | B1 * | 5/2003 | Spielman et al. | 379/88.12 |
| 6,748,229 | B1 * | 6/2004 | Calatrava-Requena et al. | 455/466 |
| 7,222,192 | B2 * | 5/2007 | Allison et al. | 709/245 |
| 2003/0003930 | A1 * | 1/2003 | Allison et al. | 455/466 |
| 2003/0012348 | A1 * | 1/2003 | Skladman et al. | 379/88.13 |
| 2003/0016639 | A1 * | 1/2003 | Kransmo et al. | 370/335 |
| 2003/0045273 | A1 * | 3/2003 | Pyhalammi et al. | 455/412 |
| 2003/0055906 | A1 * | 3/2003 | Packham et al. | 709/206 |

FOREIGN PATENT DOCUMENTS

WO   WO 9733421 A1 * 9/1997
WO   WO 01/22751 A1 * 3/2001

* cited by examiner

*Primary Examiner*—William Trost
*Assistant Examiner*—Marivelisse Santiago
(74) *Attorney, Agent, or Firm*—Frommer Lawrence & Haug LLP; Ronald R. Santucci

(57) ABSTRACT

Apparatus and method of controlling delivery of text messages to a subscriber (2, 9, 10) in a telecommunications services apparatus, the method comprising the steps of the subscriber making a selection as to a mode of delivery that the subscriber requires for one of (i) a future text message and (ii) a category of future text messages, for example delivery by fax or e-mail, the subscriber's requested selection being implemented by a message processing means (3) in the form of an SMS router which is part of the home network (B) with which the subscriber's mobile telephone is normally associated, the arrangement being such that any text messages intended by the sender (1) to be delivered to the said subscriber, as intended receiver thereof, are directed to the message processing means which then implements the delivery mode previously selected by the subscriber (2, 9, 10).

21 Claims, 1 Drawing Sheet

TELECOMMUNICATIONS SERVICES APPARATUS

This application claims priority benefits of Great Britain patent application number 0223576.0 filed Oct. 11, 2002.

FIELD OF THE INVENTION

This invention relates to telecommunications services apparatus and in particular services for the delivery of text messages to subscribers of telecommunications networks.

The term 'text message' is used herein to include variants such as Enhanced Messaging, Multimedia Messaging and the like.

BACKGROUND TO THE INVENTION

Telecommunications services in general may be controlled to some degree by the sender or by the receiver. The message content, the message medium and the timing of transmission are normally under the control of the sender. However, the recipient may for example influence the delivery of a communication by activating a message storage facility or by switching his phone off. Generally facilities available to a recipient for control of incoming communications are quite limited.

Text messaging services are prevalent in modern telecommunications networks and are enjoying continued growth. The networks are handling increasingly large volumes of message traffic, and so many networks are exploiting new technologies to improve the efficiency of message transmission.

GSM networks are specified in the relevant standards, and these define that the GSM short messaging services (SMS) are implemented by a store and forward device known as a Short Message Service Centre (SMSC). This technique is analogous to recorded voicemail, and was most beneficial in the early days of GSM, when handsets were less portable that they are today, battery life was poor and radio coverage was limited. At that time only a small proportion of text messages were deliverable at the first attempt, and so a store and forward device was appropriate.

Today the converse is true, and many networks report that 80% or more of messages are deliverable on the first attempt. Networks are therefore turning to alternative techniques for message handling to avoid the delays and cost involved in sending all messages via a storage medium. Typically, improved efficiency is gained by the use of SMS Routers in the network that allow each message to be selectively delivered by an appropriate method according to the characteristics of the message. Person-to-person traffic may be directly delivered to the recipient, and only if the recipient is unreachable is the message then passed on to a store-and-forward device instead. SMS Routers may implement throttling, load balancing, address translation and other facilities within the network to improve the efficiency or scope of services offered to subscribers.

Many facilities are available to the sender of SMS to allow him to choose the method of delivery. Some networks have partially implemented the format translations specified by the GSM standards, allowing for example a sender to indicate that a message is to delivered in fax format, and to send it to a fixed-line or mobile fax number. Also some networks support various text prefixes within the body of the message to control such features as delayed or timed delivery. Text to speech systems have been implemented by a number of operators, allowing messages to be read out during a voice call, but the feature is only selectable by the sender.

We have appreciated that it would be desirable to enable the receiver to have more control over the mode of delivery of text messages. We consider that it may be desirable for the receiver to be able to control, for example, the timing or method of delivery, or the medium by which delivery is made.

For the recipient, SMS currently offers few options. For example, although specified by the GSM standards, there is no divert facility available for text, and no translation to a different medium is available to be specified by the recipient.

Prior art for recipient control in telephone systems includes PBX facilities for diversion, forwarding, do not disturb etc. Voice mail that can be selectively switched on or off Dual or multiple SIM card support in some networks which gives some limited control of to which terminal a message is delivered.

The present invention is aimed at providing a means by which network operators may offer a greatly enhanced level of control to text message recipients.

SUMMARY OF THE INVENTION

According to one aspect of the invention we provide a method of controlling delivery of text messages to a subscriber in a telecommunications services apparatus, the method comprising the steps of the subscriber making a selection as to a mode of delivery that the subscriber requires for one of (i) a future text message and (ii) a category of future text messages, the subscriber's requested selection being implemented by a message processing means which is part of the home network with which the subscriber's mobile telephone is normally associated, the arrangement being such that any text messages intended by the sender to be delivered to the said subscriber, as intended receiver thereof, are directed to the said message processing means which then implements the delivery mode previously selected by the subscriber.

According to a second aspect of the invention we provide a telecommunications services apparatus comprising a message processing means that is capable of storing a selection of at least one selectable mode of delivery of a text message made by a subscriber to a network incorporating the message processing means and to implement at least one previously selected mode of delivery on receipt by the message processing means of a text message, intended for receipt by said subscriber, by forwarding the message to at least one delivery path of the message processing means.

The message processing means may be an SMSC or an STP (signalling transfer point), for example, but preferably the message processing means is an SMS router.

A third aspect of the invention is a telecommunication network comprising a telecommunications services apparatus in accordance with the second aspect of the invention and comprising a HLR (home location register) and a signal processing means, said signal processing means being configured in association with the HLR to intercept routing queries sent to the HLR of said network from another network, for receiving a text message from such another network, to communicate with the HLR but to provide a modified address which will cause the text message from said another network to be sent to the message processing means which will then effect delivery in accordance with at least one previously selected mode of delivery.

The message processing means may be, for example, an HLR or other signalling means, but preferably the message processing means is an SMS router.

In one embodiment of the invention, alternative delivery means may be selected by a potential recipient ('the recipient') of text messages. The recipient may choose that his text messages should be received by a different method, for example by being read out in a voice call. This feature would be useful to a car-driver who is otherwise unable to receive text messages while travelling. Examples of alternative delivery means include delivery to a fax machine
delivery to a fax mailbox
delivery to an email address
delivery by text-to-speech conversion and read-out in a voice call
delivery to a pager In a further embodiment of the present invention, additional delivery means may be selected by the recipient. The recipient may choose that in addition to being delivered by SMS in the normal way, his text messages should also be received by a different method. Examples of additional delivery means include delivery to a fax machine
delivery to a fax mailbox
delivery to an email address
delivery by text-to-speech conversion and read-out in a voice call
delivery to a pager In some cases, the additional delivery means may also be useful as a means of preserving or archiving the received messages.

The delivery method may be selected manually by the recipient in advance of potential receipt of messages. The means of control may be by SMS or USSD or another method.

The delivery means may be set up in advance by the recipient to automatically select between two or more delivery methods. The means of control may be by SMS, USSD, interactive voice call or another method. Automatic selection may for example be on the basis of time of day, being in or out of radio coverage, by the insertion of a handset into or removal of the handset from a car kit, or by being in a specified 'home' cell.

In a further application of the invention, the means, timing, allowability or other aspect of the delivery process may be configured so as to be determined by a characteristic or characteristics of the message. For example filtering could be performed according to text matching or according to an address white list or black list. Certain origination addresses for example that matched against a list could be delivered immediately while others were only delivered between certain hours. Filtering according to textual content could allow the user to specify key words, names or phrases that would trigger certain delivery rules.

A key feature of the present invention is that it permits recipients of text messages to enjoy some control over how and/or when messages are delivered to them, which is a facility not presently possible in current networks. The invention is implemented by enabling a means for the potential recipient of messages to determine in advance the behaviour of one or more SMS Routers in handling messages destined for that recipient. The recipient's network can use known techniques to ensure that both mobile originated and mobile terminated messages pass through SMS Routers. The novel combination of these techniques provides the recipient with control over message delivery.

Two classes of message delivery may be considered
1. Mobile Originated (MO) where the sender and the recipient are subscribers to the same network, and the text message arrives at the SMS router in MO format. According to options previously configured by the intended recipient, the SMS Router may deliver the message by one or more methods. For example the recipient may have specified that text messages should be converted to voice and delivered in a voice call.
2. Mobile Terminated (MT) where the sender subscribes to network A and the recipient to network B, and so the MO text message first passes through the SMSC of network A, where it is converted to MT format. Without known special steps being taken by network B, the MT message would pass directly to the recipient without necessarily passing through one of the SMS Routers in network B. Indeed if both parties are roaming on other networks, the text message may never normally pass though network B at all. Since the invention is implemented by the SMS Router in network B, it is essential to ensure that the MT message passes through such an SMS Router regardless of to which network the sender and recipient are currently attached.

In the first (MO) case, it is straightforward to ensure that all MO messages pass through an SMS router, and many networks are implementing architectures that do this for a variety of applications including network overload protection
separation ("grooming") of high volume traffic
value added services In these cases, the network arranges that all MO traffic is passed through MS Routers prior to arriving at an SMSC. This allows filtering and load balancing operations for example to be carried out, thus controlling the network loading and optionally providing additional features and services. The present invention may be implemented as a service on such an SMS Router.

In the second (MT) case, a known technique called SRI aliasing may be used to ensure that the text message passes to an equipment in network B. Whenever any other network wishes to send a text message to a recipient who subscribes to network B, a routing query called "Send Routing Information for Short Message (SRI-SM)" will be sent from the originating network's SMSC to the HLR in network B. Network B's signalling architecture can be configured to direct these SRI-SM messages via an SMS Router in Network B. The SMS Router may then respond on behalf of the HLR, but instead of directing the MT text message to the destination mobile as the HLR would have done, it may direct the MT text message to be routed to an SMS Router in Network B, which SMS Router is configured to implement the invention. This redirection may be made conditional on the recipient having subscribed to a relevant value-added service, or may be unconditional.

Once the MT text message has arrived at an SMS router in network B, it may be handled in essentially the same way as for the MO case, with the exception that the message is not ever routed to the SMSC in network B. The SMSC for this message is in network A, and if direct delivery to the recipient is attempted but unsuccessful, then control is passed back to the originating SMSC.

The preceding description shows how both MO and MT messages for a recipient in network B may be caused to pass through an SMS Router that implements the present invention. An additional necessary requirement is for the recipient to be provided with a means to control the delivery, and this will now be discussed.

Automatic or manual control of the reception method could be implemented by USSD. Using this technique, commands may be sent to network B from any network on which the recipient may be roaming. By careful choice of the USSD commands, they may chosen from a subset which are specified by GSM to be passed to the HLR of the subscriber's home network (network B). The HLR may then be configured to pass these particular commands to the SMS Router(s) in order to configure the desired delivery options.

Automatic or manual control of the reception method could be implemented by SMS. Using this technique commands may be sent by the subscriber and intercepted by the message processing means. The interception could be performed either by the subscriber sending the command messages to a predefined destination number, or by another means. The intercepted commands are then used to configure the desired delivery options.

Sim Toolkit could be used to provide a more friendly user interface. Instead of entering USSD commands, the delivery options could then be selected from a handset menu.

SIM toolkit could also be used to automate the configuration of certain delivery options, for example always setting up delivery by voice when the handset is inserted into a car kit.

Using the techniques described above, potential recipients of messages could be offered services including but not limited to normal message delivery
delayed message delivery during certain hours
Diversion of messages to fixed line when in home cell
diversion of messages to an alternative mobile number
diversion of messages on a time of day basis
conversion of messages to email, fax or other medium
conversion of messages to voice for delivery in a voice call
archiving of received messages
special handling of certain messages according to origination number, e.g. white lists, black lists
removal of 'spam' messages
filtering of messages by address information or content
filtering or barring of messages with unsuitable content
any combination of the above The invention will now be further described, by way of example only, with reference to the accompanying drawings.

DESCRIPTION OF PREFERRED
EMBODIMENTS

Figure 1:
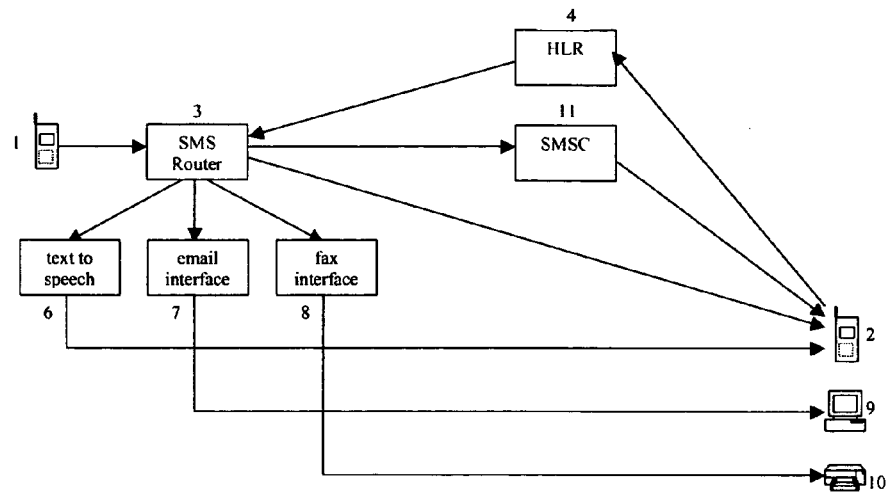
FIG. 1 is a schematic of a network incorporating an SMS router in accordance with the invention, controlling alternative delivery paths, and showing communication paths between two mobile telephones, currently operating on the same network, and the SMS router.

With reference to FIG. 1, a message sender [1] is connected to a telecommunications network and wishes to send a text message to a recipient [2] who subscribes to the same network. The message passes via an SMS Router [3]. The recipient may configure delivery options in the SMS router by means of commands (e.g. using USSD) sent to the router via the HLR [4]. The router is connected to a text-to-speech interface [6], an email interface [7] and a fax interface [8]. If the router detects that the message is for a recipient who has configured special delivery settings, e.g. delivery by email to an email account [9] or by fax to a fax machine [10], then the router can perform delivery via the relevant interface in addition to, or instead of, the normal SMS delivery.

In other cases the router delivers the text message either directly to the recipient [2] or via the SMSC [11].

Figure 2:
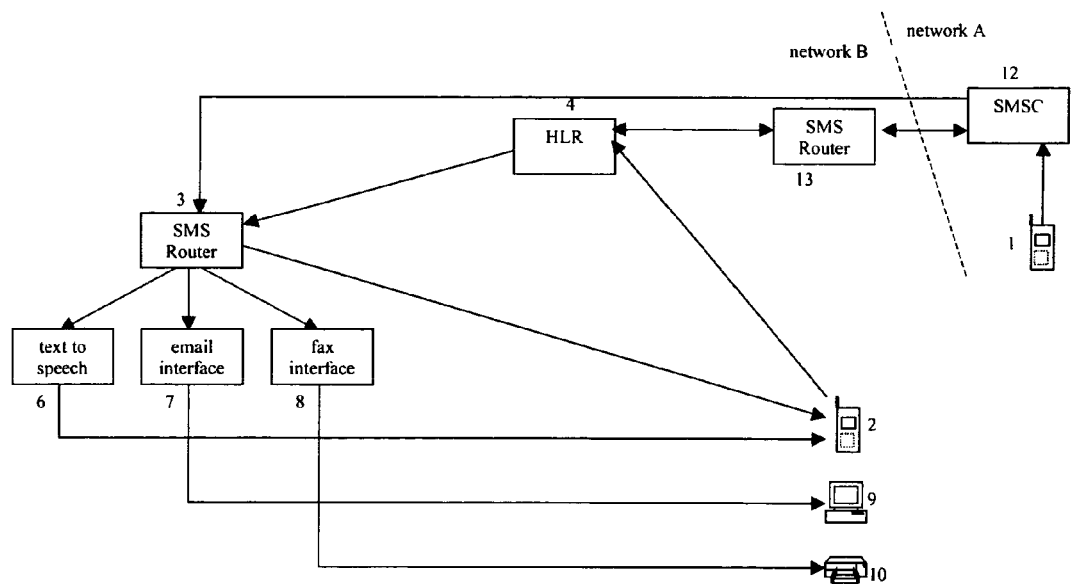
FIG. 2 is a schematic similar to FIG. 1 but showing the corresponding communication paths when the two mobile telephones are currently operating on two different networks.

With reference to FIG. 2, a message sender [1] is connected to a telecommunications network A and wishes to send a text message to a recipient [2] who subscribes to network B. The message passes first via the service centre [12] of network A, where a routing query is made to the HLR [4] of network B. This query is caused by network B to pass through an SMS router [13]. If the router detects that the message is for a recipient who has configured special delivery settings, e.g. delivery by email to an email account [9] or by fax to a fax machine [10], then the router responds to the routing query, giving the address of the SMS Router [3] in network B.

The message then passes from the SMSC [12] to the SMS Router [3]. As before, the recipient may configure delivery options in the SMS router [3] by means of commands (e.g. using USSD) sent to the router via the HLR [4]. If the router detects that the message is for a recipient who has configured special delivery settings, e.g. delivery by email to an email account [9] or by fax to a fax machine [10], then the router can perform delivery via the relevant interface in addition to, or instead of, SMS delivery. SMS delivery if required is attempted directly to the recipient [2]. If this is unsuccessful, then the SMSC [12] is notified as normal may retry according to its internal schedule.

Routers [3] and [13] may or may not be the same router or logical group of routers.

The architecture described could also be utilised for legal interception applications.

| | Glossary |
|---|---|
| EMS | Enhanced Messaging Service |
| MAP | Mobile Application Protocol |
| MMS | Multimedia Messaging Service |
| MO | Mobile Originated |
| MSC | Mobile Switching Centre |
| MT | Mobile Terminated |
| SMPP | Short Message Peer to Peer protocol |
| SMS | Short Message Service of the GSM mobile telephone system |
| SMS Router | Equipment which embodies the invention and filters and responds to certain text messages. |
| SMSC | Short Message Service Centre |
| SS7 | CCITT Signalling System no 7 |
| TCP/IP | Transmission Control Protocol/Internet Protocol. A well known internet data protocol. |
| HLR | Home Location Register |
| USSD | Unstructured Supplementary Services Data |
| STP | Signalling Transfer Point |

The invention claimed is:

1. A method of controlling delivery of text messages to a subscriber in a telecommunications services apparatus, the method comprising the steps of:
   selecting a mode of delivery from a plurality of delivery modes by the subscriber for at least one selected from the group consisting of (i) a future text message and (ii) a category of future text messages;
   implementing the selected mode of delivery by a message processing means which is part of a home network with which the subscriber's mobile telephone is associated, wherein text messages intended by a sender for delivery to said subscriber are directed to the message processing means which then implements the selected delivery mode;

intercepting a routing query from another network made in response to a request from a user associated with said another network by a single processing means provided in said home network;

detecting by the signal processing means that the subscriber has selected a mode of delivery; and providing by the signal processing means, in response to the routing query on behalf of an HLR (home location register) of the home network, a modified address which causes the text message from said another network to be directed to said message processing means for implementation of said delivery mode, wherein the modified address is used instead of an address from the HLR.

2. The method of claim 1 in which the message processing means is an SMS router.

3. The method of claim 2 in which the signal processing means is an SMS router.

4. The method of claim 3 in which the signal processing means is an SMS router.

5. The method of claim 1 in which one of the delivery modes which is available is a mode providing a delayed message delivery during selected hours of the day.

6. The method of claim 1 in which one of the delivery modes which is available is a mode providing diversion of text messages to fixed line when the subscriber is in a home cell.

7. The method of claim 1 in which one of the delivery modes which is available is a mode providing diversion of messages to an alternative mobile number.

8. The method of claim 1 in which one of the delivery modes which is available is a mode providing diversion of messages on a time of day basis.

9. The method of claim 1 in which one of the delivery modes which is available is a mode providing conversion of messages to voice for delivery in a voice call.

10. The method of claim 1 in which one of the delivery modes which is available is a mode providing special handling of some messages according to originator number.

11. The method of claim 1 in which one of the delivery modes which is available is a mode providing filtering of messages by address information or content.

12. The method of claim 1 in which one of the delivery modes which is available is a mode providing delivery by fax.

13. The method of claim 1 in which one of the delivery modes which is available is a mode providing delivery by e-mail.

14. The method of claim 1 in which the subscriber makes the selection by a USSD command.

15. The method of claim 1 in which the subscriber makes the selection by an SMS.

16. The method of claim 1 in which the subscriber makes the selection by means of an interactive voice call.

17. The method of claim 1 in which one of the delivery modes which is available is a mode providing delivery by voice call.

18. A telecommunications network comprising:

a message processing means that is capable of storing a selection of at least one selectable mode of delivery of a text message made by a subscriber to a network incorporating the message processing means and to implement at least one previously selected mode of delivery on receipt by the message processing means of a text message, intended for receipt by said subscriber, by forwarding the message to at least one delivery path of the message processing means;

an HLR (home location register); and a signal processing means, said signal processing means being configured in association with the HLR to intercept routing queries sent to the HLR of said network from another network, for receiving a text message from such another network, to detect that the subscriber has previously made a selection as to a chosen mode of delivery and to communicate with the HLR but to provide a modified address which will cause the text message from said another network to be sent to the message processing means which will then effect delivery in accordance with a previously selected mode or modes of delivery, wherein the modified address is used instead of an address from the HLR.

19. A telecommunications services apparatus as claimed in claim 18 in which the message processing means is an SMS router.

20. A telecommunications network as claimed in claim 18 in which the signal processing means is an SMS router.

21. A telecommunications services apparatus comprising:

a home location register (HLR);

a signal processing means configured to intercept routing queries sent to the HLR of one network from another network, the signal processing means being configured to detect that a subscriber has previously made a selection as to a chosen mode of delivery and to communicate with the HLR to provide a modified address which will cause a text message from said another network to be sent to a message processing means, the message processing means being operative to effect delivery in accordance with a mode or modes of delivery previously selected by a recipient of the message, wherein the modified address is used instead of an address from the HLR.

* * * * *